(12) United States Patent
Qiu et al.

(10) Patent No.: US 10,491,344 B2
(45) Date of Patent: Nov. 26, 2019

(54) SIGNAL TRANSMISSION METHOD AND APPARATUS

(71) Applicant: HUAWEI TECHNOLOGIES CO., LTD., Shenzhen, Guangdong (CN)

(72) Inventors: Jing Qiu, Chengdu (CN); Ming Jia, Ottawa (CA); Jianglei Ma, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/265,434

(22) Filed: Feb. 1, 2019

(65) Prior Publication Data

US 2019/0165907 A1 May 30, 2019

Related U.S. Application Data

(63) Continuation of application No. PCT/CN2017/091430, filed on Jul. 3, 2017.

(30) Foreign Application Priority Data

Aug. 1, 2016 (CN) .......................... 2016 1 0624580

(51) Int. Cl.
*H04L 5/00* (2006.01)
*H04L 1/06* (2006.01)
*H04B 1/00* (2006.01)
*H04L 27/26* (2006.01)
*H04B 7/0456* (2017.01)
*H04B 7/06* (2006.01)
(Continued)

(52) U.S. Cl.
CPC ......... *H04L 5/0023* (2013.01); *H04B 1/0017* (2013.01); *H04B 7/0413* (2013.01);
(Continued)

(58) Field of Classification Search
CPC .. H04B 7/0456; H04B 7/0697; H04B 1/0017; H04B 7/0413; H04L 5/0023; H04L 1/06;
(Continued)

(56) References Cited

U.S. PATENT DOCUMENTS

2010/0284483 A1 11/2010 Jongren
2011/0142001 A1 6/2011 Ko et al.
(Continued)

FOREIGN PATENT DOCUMENTS

CN 101884176 A 11/2010
CN 104823402 A 8/2015
(Continued)

OTHER PUBLICATIONS

PCT International Search Report and Written Opinion in International Application No. PCT/CN2017/091430, dated Sep. 28, 2017, 15 pages (with English translation).
(Continued)

*Primary Examiner* — David B Lugo
(74) *Attorney, Agent, or Firm* — Fish & Richardson P.C.

(57) ABSTRACT

Embodiments of this application provide a signal transmission method and apparatus, and the method includes: filtering a first time domain orthogonal frequency division multiplexing (OFDM) signal at each of M spatial transmission layers, where M is an integer greater than or equal to 1; performing spatial precoding on the filtered first time domain OFDM signal at each of the M spatial transmission layers, and mapping the filtered first time domain OFDM signal at each of the M spatial transmission layers to each of $N_t$ transmit antenna ports, where $N_t$ is an integer greater than or equal to M; and superposing and transmitting the first time domain OFDM signals that are at the M spatial transmission layers and that are mapped to all the $N_t$ transmit antenna ports.

10 Claims, 10 Drawing Sheets

(51) Int. Cl.
*H04B 7/0413* (2017.01)
*H04L 25/03* (2006.01)

(52) U.S. Cl.
CPC ......... *H04B 7/0456* (2013.01); *H04B 7/0697* (2013.01); *H04L 1/06* (2013.01); *H04L 5/0007* (2013.01); *H04L 27/2601* (2013.01); *H04L 27/264* (2013.01); *H04L 27/2628* (2013.01); *H04L 2025/03414* (2013.01)

(58) Field of Classification Search
CPC ............... H04L 5/0007; H04L 27/2601; H04L 27/2628; H04L 27/264
See application file for complete search history.

(56) References Cited

U.S. PATENT DOCUMENTS

2015/0304146 A1* 10/2015 Yang ..................... H04L 5/0066
 370/329
2016/0006464 A1* 1/2016 Stadelmeier ...... H04L 25/03828
 375/296
2017/0264476 A1 9/2017 Yang et al.
2017/0359109 A1* 12/2017 Baldemair ........... H04B 7/0456

FOREIGN PATENT DOCUMENTS

| | | |
|---|---|---|
| CN | 105471800 A | 4/2016 |
| GB | 2463508 A | 3/2010 |

OTHER PUBLICATIONS

Extended European Search Report issued in European Application No. 17836246.3 dated May 16, 2019, 10 pages.

R1-165425—Huawei et al., "f-OFDM scheme and filter design," 3GPP TSG RAN WG1 Meeting #85, Nanjing, China, May 23-27, 2016, 10 pages.

* cited by examiner

SIGNAL TRANSMISSION METHOD AND APPARATUS

CROSS-REFERENCE TO RELATED APPLICATIONS

This application is a continuation of International Application No. PCT/CN2017/091430, filed on Jul. 3, 2017, which claims priority to Chinese Patent Application No. 201610624580.0, filed on Aug. 1, 2016. The disclosures of the aforementioned applications are hereby incorporated by reference in their entireties.

TECHNICAL FIELD

Embodiments of this application relate to the communications field, and specifically, to a signal transmission method and apparatus.

BACKGROUND

Filtered-orthogonal frequency division multiplexing (F-OFDM) is sub-band filtering-based OFDM. In an F-OFDM waveform technology, a spectrum is divided into a plurality of sub-bands, and numerology of different sub-bands may be the same or may be different. Numerology of a sub-band includes at least one of the following parameters such as subcarrier bandwidth, a transmission time interval (TTI) length, a symbol length, a quantity of symbols, and a cyclic prefix (CP) length. The numerology of the sub-band may be preconfigured, or may be flexibly adapted based on service load. Different sub-bands may be used for different types of services. For example, a conventional voice/video, the Internet of Things (IOT), a real-time Internet of Vehicles, and a Multimedia Broadcast Multicast Service (MBMS) are respectively distributed in different sub-bands. Then, each sub-band is filtered, for example, a higher-order digital molding filter is used for filtering. The filtered sub-band has good out-of-band performance, so as to implement decoupling of each sub-band. Therefore, when a conventional OFDM waveform is compatible, different numerology may be configured for sub-bands based on an actual service scenario.

A higher order of a filter indicates a better out-of-band feature, but indicates higher implementation complexity. Therefore, a low-complexity filter design is a core problem in F-OFDM application. However, a multiple-input multiple-output (MIMO) technology is one of most basic technologies in a wireless communications system, and any new technology, including the F-OFDM, needs to be used in combination with the MIMO technology. When the F-OFDM is applied to a MIMO system, a time domain signal on each antenna port needs to be filtered in the prior art. Therefore, for a sub-band, a total quantity of filtering operations of a transmitter is equal to a product that is obtained by multiplying a quantity of filtering operations on one antenna port by a total quantity of transmit antennas, and filtering complexity is relatively high.

SUMMARY

Embodiments of this application provide a signal transmission method and apparatus, so as to reduce filtering complexity.

According to a first aspect, a signal transmission method is provided, and the method includes: filtering a first time domain OFDM signal at each of M spatial transmission layers, where M is an integer greater than or equal to 1; performing spatial precoding on the filtered first time domain OFDM signal at each of the M spatial transmission layers, and mapping the filtered first time domain OFDM signal at each of the M spatial transmission layers to each of $N_t$ transmit antenna ports, where $N_t$ is an integer greater than or equal to M; and superposing and transmitting the first time domain OFDM signals that are at the M spatial transmission layers and that are mapped to all the $N_t$ transmit antenna ports.

According to the signal transmission method in this embodiment of this application, a sequence of performing spatial precoding and a filtering operation in the prior art is adjusted, that is, the filtering operation is first performed on a time domain OFDM signal (for example, the first time domain OFDM signal) at each of the M spatial transmission layers, then spatial precoding is performed, and the filtered time domain OFDM signal at the spatial transmission layer is mapped to each transmit antenna port for transmission. In this way, a quantity of filtering operations is directly proportional to a quantity of spatial transmission layers instead of a quantity of transmit antenna ports. Because the quantity of spatial transmission layers is less than or equal to the quantity of transmit antenna ports in a MIMO system, according to the signal transmission method in this embodiment of this application, filtering complexity during signal transmission can be reduced.

In a possible implementation, the filtering a first time domain OFDM signal at each of M spatial transmission layers includes: filtering the first time domain OFDM signal at each of the M spatial transmission layers at a first sampling rate; before the performing spatial precoding on the filtered first OFDM signal at each of the M spatial transmission layers, the method may further include: performing upsampling on the filtered first time domain OFDM signal at each of the M spatial transmission layers at a second sampling rate, where the second sampling rate is greater than the first sampling rate; and performing, at the second sampling rate, digital frequency conversion on the first time domain OFDM signal that is obtained after upsampling and that is at each of the M spatial transmission layers, so that a center frequency of the first time domain OFDM signal that is obtained after upsampling and that is at each of the M spatial transmission layers is located in a frequency location corresponding to a system broadband to which the first time domain OFDM signal belongs; and the performing spatial precoding on the filtered first OFDM signal at each of the M spatial transmission layers includes: performing spatial precoding on the first time domain OFDM signal that is obtained after digital frequency conversion and that is at each of the M spatial transmission layers.

For downlink transmission, signal transmission may be performed by using a segment filtering method. The first time domain OFDM signal may be a sideband signal of a broadband OFDM signal. The sideband signal is located on an edge, and needs to be filtered through higher-order digital molding filtering, to obtain a very narrow transition band, thereby implementing good out-of-band performance. Therefore, there is still a problem of high filtering complexity. However, in this embodiment of this application, a filtering operation is first performed on a time domain OFDM signal (for example, the first time domain OFDM signal) at each of the M spatial transmission layers, then spatial precoding is performed, and the filtered time domain OFDM signal at the spatial transmission layer is mapped to each transmit antenna port for transmission. In this way, a quantity of filtering operations is directly proportional to a quantity of spatial transmission layers instead of a quantity of transmit antenna ports. Because the quantity of spatial transmission layers is less than or equal to the quantity of transmit antenna ports in the MIMO system, according to the signal transmission method in this embodiment of this application, filtering complexity during signal transmission can be reduced.

In a possible implementation, the method may further include: filtering a second time domain OFDM signal at each of N spatial transmission layers at a third sampling rate, where N is an integer greater than or equal to 1; performing upsampling on the filtered second time domain OFDM signal at each of the N spatial transmission layers at a fourth sampling rate, where the fourth sampling rate is greater than the third sampling rate; performing, at the fourth sampling rate, digital frequency conversion on the second time domain OFDM signal that is obtained after upsampling and that is at each of the N spatial transmission layers, so that a center frequency of the second time domain OFDM signal that is obtained after upsampling and that is at each of the N spatial transmission layers is located in a frequency location corresponding to a system broadband to which the second time domain OFDM signal belongs; performing spatial precoding on the second time domain OFDM signal that is obtained after digital frequency conversion and that is at each of the N spatial transmission layers, and mapping the filtered second time domain OFDM signal at each of the N spatial transmission layers to the $N_t$ transmit antenna ports; and the superposing and transmitting the first time domain OFDM signals that are at the M spatial transmission layers and that are mapped to all the $N_t$ transmit antenna ports includes: superposing and transmitting the first time domain OFDM signals that are at the M spatial transmission layers and that are mapped to all the $N_t$ transmit antenna ports and the second time domain OFDM signals at the N spatial transmission layers.

In a possible implementation, the method may further include: filtering a third time domain OFDM signal corresponding to each of the $N_t$ transmit antenna ports at a fifth sampling rate, where the fifth sampling rate is greater than the first sampling rate and/or the third sampling rate; and the superposing and transmitting the first time domain OFDM signals that are at the M spatial transmission layers and that are mapped to all the $N_t$ transmit antenna ports includes: superposing and transmitting the first time domain OFDM signals that are at the M spatial transmission layers and that are mapped to all the $N_t$ transmit antenna ports, the second time domain OFDM signals at the N spatial transmission layers, and the filtered third time domain OFDM signal.

In a possible implementation, the performing spatial precoding on the filtered first time domain OFDM signal at each of the M spatial transmission layers, and mapping the filtered first time domain OFDM signal at each of the M spatial transmission layers to $N_t$ transmit antenna ports includes: separately mapping, by using a time domain precoding vector $W_i$ on first filtering bandwidth, the filtered first time domain OFDM signal at an $i^{th}$ spatial transmission layer in the M spatial transmission layers to the $N_t$ transmit antenna ports, where i=1, 2, ..., M, and i represents an index of the M spatial transmission layers.

In a possible implementation, the performing spatial precoding on the second time domain OFDM signal that is obtained after digital frequency conversion and that is at each of the N spatial transmission layers, and mapping the filtered second time domain OFDM signal at each of the N spatial transmission layers to the $N_t$ transmit antenna ports includes: separately mapping, by using a time domain pre-coding vector $W_j$ on second filtering bandwidth, the filtered second time domain OFDM signal at a $j^{th}$ spatial transmission layer in the N spatial transmission layers to the $N_t$ transmit antenna ports, where j=1, 2, ..., N, and j represents an index of the N spatial transmission layers.

In a possible implementation, when the first time domain OFDM signal at each of the M spatial transmission layers is filtered, the method includes: performing time domain filtering or frequency domain filtering on the first time domain OFDM signal at each of the M spatial transmission layers.

According to a second aspect, a signal transmission apparatus is provided, including a unit that is configured to perform the method according to any one of the first aspect or the possible implementations of the first aspect.

According to a third aspect, a signal transmission apparatus is provided, including a processor, a transceiver, and a memory. The memory is configured to store an instruction, and the processor is configured to execute the instruction stored in the memory, so as to control the transceiver to receive and/or send a signal. When the processor executes the instruction stored in the memory, the processor is configured to perform the method according to any one of the first aspect or the possible implementations of the first aspect.

According to a fourth aspect, a computer-readable medium is provided, configured to store a computer program, where the computer program includes an instruction used to perform the method according to any one of the first aspect or the possible implementations of the first aspect.

DESCRIPTION OF EMBODIMENTS

The following describes in detail the technical solutions in the embodiments of this application with reference to the accompanying drawings in the embodiments of this application.

The technical solutions in the embodiments of this application may be applied to various communications systems in a wireless cellular network, for example, a Global System for Mobile Communications (GSM), a Code Division Multiple Access (CDMA) system, a Wideband Code Division Multiple Access (WCDMA) system, a general packet radio service (GPRS) system, an LTE system, a Universal Mobile Telecommunications System (UMTS), and a future 5G communications system. This is not limited in the embodiments of this application.

Figure 1:
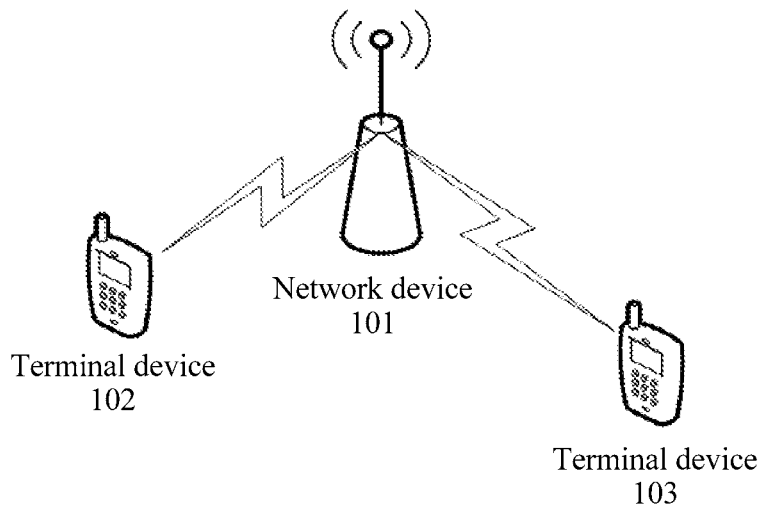
FIG. 1 is a schematic diagram of an application scenario of a signal transmission method applicable to an embodiment of this application.

FIG. 1 shows a communications system of a signal transmission method applicable to an embodiment of this application. As shown in FIG. 1, the communications system applied to this embodiment of this application includes a network device 101, a terminal device 102, and a terminal device 103. When a transmitter is a part of the network device 101, a receiver is a part of the terminal device 102 or a part of the terminal device 103. Alternatively, when a transmitter is a part of the terminal device 102 or a part of the terminal device 103, a receiver is a part of the network device 101.

The terminal device (for example, the terminal device 102 or the terminal device 103) may communicate with one or more core networks by using a radio access network (RAN). The terminal device may be user equipment (UE), an access terminal, a subscriber unit, a subscriber station, a mobile station, a mobile console, a remote station, a remote terminal, a mobile device, a user terminal, a terminal, a wireless communications device, a user agent, or a user apparatus. The access terminal may be a cellular phone, a cordless phone, a Session Initiation Protocol (SIP) phone, a wireless local loop (WLL) station, a personal digital assistant (PDA), a handheld device having a wireless communication function, a computing device, another processing device connected to a wireless modem, an in-vehicle device, a wearable device, a terminal device in a future 5G network, or the like.

The network device (for example, the network device 101) may be a device configured to communicate with the terminal device. For example, the network device may be a base transceiver station (BTS) in a GSM system or a CDMA system, may be a NodeB (NB) in a WCDMA system, or may be an evolved NodeB (eNB or eNodeB) in an LTE system; or the network device may be a relay station, an access point, an in-vehicle device, a wearable device, a network side device in a future 5G network, or a network device in a future evolved PLMN network.

The signal transmission method in this embodiment of this application may be applied to a MIMO system. An F-OFDM waveform technology may be used in the MIMO system. In the F-OFDM waveform technology, system bandwidth is divided into several sub-bands. Then, each sub-band is filtered. A higher-order digital molding filter may be used for filtering. When each sub-band is filtered, according to one method, a linear filtering operation is performed on a baseband signal on each transmit antenna port. However, in this manner, filtering operation complexity is directly proportional to a quantity of antenna ports. If there is only one sub-band in the system bandwidth, in other words, k=1, a quantity of filters required by the transmitter is $N_t$ ($N_t$ is a quantity of transmit antenna ports), and a quantity of filters required by the receiver is $N_r$ ($N_r$ is a quantity of receive antenna ports). If there are k sub-bands in entire system bandwidth, a total quantity of filters is $k \times N_t$. Therefore, when the F-OFDM is used in the MIMO system, at least one filter is used on each antenna, and consequently complexity of an entire system is greatly increased. Especially for uplink transmission of a terminal, high-complexity MIMO application brings a great challenge to terminal costs and energy conservation.

To resolve a problem of relatively high filtering complexity, an embodiment of this application provides a signal transmission method.

Figure 2:
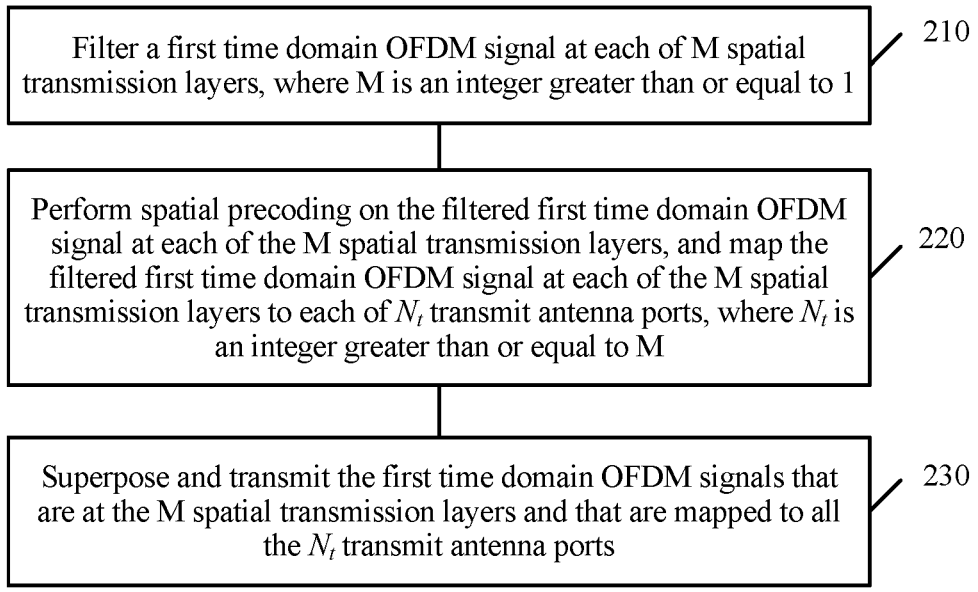
FIG. 2 is a schematic flowchart of a signal transmission method according to an embodiment of this application.

FIG. 2 shows a signal transmission method according to an embodiment of this application. The method shown in FIG. 2 may be performed by a transmitter.

210. Filter a first time domain OFDM signal at each of M spatial transmission layers, where M is an integer greater than or equal to 1.

Herein, the first time domain OFDM signal may be a signal that is generated after operations of serial-to-parallel conversion, scrambling, modulation, layer mapping, inverse fast Fourier transformation (IFFT), and cyclic prefix (CP) addition are sequentially performed on an original transmission codeword. Specifically, for the operations of serial-to-parallel conversion, scrambling, modulation, layer mapping, IFFT, and CP addition, refer to the prior art. For brevity, details are not described herein.

Herein, the first time domain OFDM signal may be filtered by using a higher-order digital molding filter.

A digital molding filter may be classified into a higher-order digital molding filter and a lower-order digital molding filter based on a value of a filtering order. A filtering order of the higher-order digital molding filter is set to be relatively large, so as to ensure that a signal passing through the higher-order digital molding filter has a very narrow transition band, thereby implementing good out-of-band performance. A filtering order of the lower-order digital molding filter is set to be relatively small. Specifically, if a filtering order of the digital molding filter is higher, a transition band of a filtered signal is narrower.

Optionally, in this embodiment of this application, when the first time domain OFDM signal at each of the M spatial transmission layers is filtered, time domain filtering or frequency domain filtering may be performed on the first time domain OFDM signal at each of the M spatial transmission layers. In other words, a filtering operation in this embodiment of this application may be performed in time domain, or may be performed in frequency domain. This is not limited in this embodiment of this application. Higher-order digital molding filtering that is implemented by using the higher-order digital molding filter is time domain filtering.

220. Perform spatial precoding on the filtered first time domain OFDM signal at each of the M spatial transmission layers, and map the filtered first time domain OFDM signal at each of the M spatial transmission layers to each of $N_t$ transmit antenna ports.

A quantity of transmit antenna ports is greater than or equal to a quantity of spatial transmission layers. Therefore, $N_t$ herein is an integer greater than or equal to M.

For ease of description, in the following, the filtered first time domain OFDM signal may be referred to as a first F-OFDM signal.

Specifically, after filtering processing is performed on the first time domain OFDM signal, the transmitter multiplies the obtained first F-OFDM signal at each spatial transmission layer by a spatial precoding vector $W_i$ corresponding to the spatial transmission layer. The first F-OFDM signal at the spatial transmission layer is mapped to each transmit antenna port, so as to obtain data on each transmit antenna port. In other words, the data on the transmit antenna port includes data that is obtained by mapping the first F-OFDM signal at each spatial transmission layer to the transmit antenna port. $W_i = [w_{i1} \ w_{i2} \ \ldots \ w_{iN_t}]$, i=1, 2, ..., M, and i represents an index of the M spatial transmission layers.

It should be noted that in this embodiment of this application, a spatial precoding operation is performed in time domain, and the first F-OFDM signal is mapped from a spatial transmission layer to a transmit antenna port by using a time domain spatial precoding vector. However, in a conventional MIMO system, a spatial precoding operation is performed in frequency domain, first OFDM frequency domain data is mapped from a spatial transmission layer to a transmit antenna port by using a frequency domain spatial precoding vector, and then a filtering operation is performed on time domain data obtained after spatial precoding. The spatial precoding vector $W_i=[w_{i1}\ w_{i2}\ \ldots\ w_{iN_t}]$ herein is a time domain expression form of the frequency domain spatial precoding vector in the conventional MIMO at a high sampling rate. However, for time-domain transmit data that is finally generated on each antenna port, the spatial precoding operation performed in time domain is equivalent to that performed in frequency domain.

230. Superpose and transmit the first time domain OFDM signals that are at the M spatial transmission layers and that are mapped to all the $N_t$ transmit antenna ports.

Specifically, after spatial precoding processing is performed on the first F-OFDM signal, data that is obtained by mapping the first F-OFDM signal at all spatial transmission layers to transmit antenna ports is superposed and transmitted.

It should be understood that the data on the transmit antenna port may include more than the first F-OFDM signals that are at the M spatial transmission layers and that are corresponding to the transmit antenna port. In other words, the first F-OFDM signals that are at the M spatial transmission layers and that are corresponding to the transmit antenna port may be only a part of data on the transmit antenna port, and the data on the transmit antenna port may further include other data. For example, when the first OFDM signal is merely a signal on a sub-band in the MIMO system, the data on the transmit antenna port further includes data on another sub-band in the MIMO system.

According to the signal transmission method in this embodiment of this application, a sequence of performing spatial precoding and a filtering operation in the prior art is adjusted, that is, the filtering operation is first performed on a time domain OFDM signal (for example, the first time domain OFDM signal) at each of the M spatial transmission layers, then spatial precoding is performed, and the filtered time domain OFDM signal at the spatial transmission layer is mapped to each transmit antenna port for transmission. In this way, a quantity of filtering operations is directly proportional to a quantity of spatial transmission layers instead of a quantity of transmit antenna ports. Because the quantity of spatial transmission layers is less than or equal to the quantity of transmit antenna ports in the MIMO system, according to the signal transmission method in this embodiment of this application, filtering complexity during signal transmission can be reduced.

A time domain OFDM signal transmission method in this embodiment of this application may be applied to a multi-antenna transmitter on an uplink terminal side. For example, this embodiment of this application may be applied to a scenario in which the terminal device 102 or the terminal device 103 shown in FIG. 1 transmits data to the network device 101.

Figure 3:
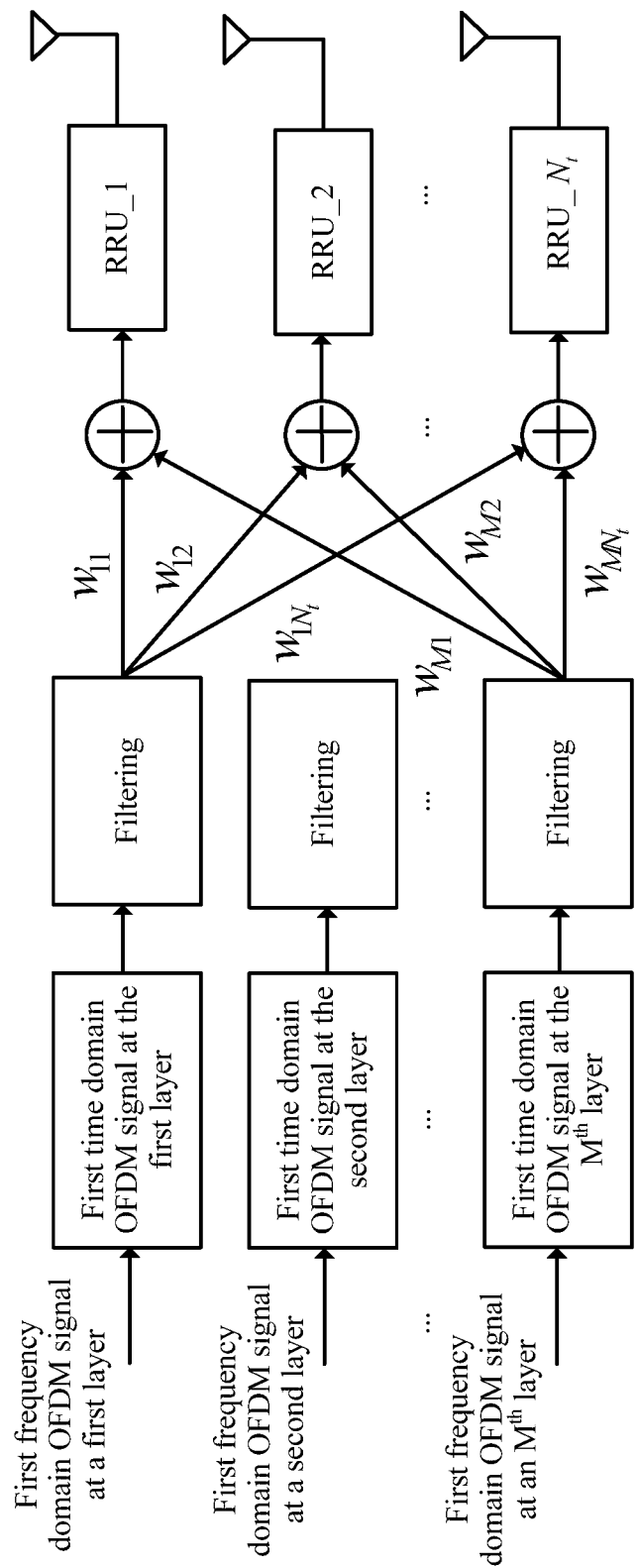
FIG. 3 is a schematic block diagram of a signal transmission method according to an embodiment of this application.

The following describes in detail the signal transmission method according to this embodiment of this application with reference to FIG. 3. The method shown in FIG. 3 may be performed by a transmitter in the terminal device 102 shown in FIG. 1.

It should be understood that, when the terminal device 102 transmits the data to the network device 101, the transmitter in the terminal device 102 may first sequentially perform operations of serial-to-parallel conversion, scrambling, modulation, and layer mapping on an original transmission codeword, to generate a first frequency domain OFDM signal at each of the M spatial transmission layers.

After the first frequency domain OFDM signal at each of the M spatial transmission layers is generated, as shown in FIG. 3, the transmitter in the terminal device 102 may generate a first time domain OFDM signal based on the first frequency domain OFDM signal at each of the M spatial transmission layers. Herein, the transmitter in the terminal device 102 may sequentially perform operations of IFFT and cyclic prefix CP addition on the first frequency domain OFDM signal, to generate the first time domain OFDM signal. The transmitter in the terminal device 102 performs filtering (for example, higher-order digital molding filtering) on the first time domain OFDM signal at each of the M spatial transmission layers. Then, the transmitter in the terminal device 102 performs, by using a spatial precoding vector $W_i$, spatial precoding on a filtered first F-OFDM signal, and maps the F-OFDM signal at each of the M spatial transmission layers to a transmit antenna port. Finally, data on all transmit antenna ports is superposed, and is output to corresponding radio remote units (RRU): RRU_1, RRU_2, ..., and RRU_$N_t$. The radio remote unit transmits the data on each transmit antenna port by using a corresponding transmit antenna.

After receiving data transmitted by the transmitter, a receiver at a receive end (for example, the network device 101) may perform processing by using the prior art. For example, the receiver may sequentially perform operations of filtering, CP deletion, discrete Fourier transform FFT (fast fourier transformation, FFT), and MIMO spatial detection on data that is received on each receive antenna, to restore the transmitted first frequency domain OFDM signal. For the processing operation performed by the receiver on the received data, refer to the prior art. For brevity, details are not described herein.

Therefore, the first time domain OFDM signal is first filtered, and then spatial precoding is performed. In this way, a quantity of higher-order digital molding filters required by the transmitter is M. Compared with $N_t$ ($N_t \geq M$) higher-order digital molding filters required in the prior art, according to the signal transmission method in this embodiment of this application, the quantity of higher-order digital molding filters that are required for use can be reduced.

Optionally, in step 210, when the first time domain OFDM signal at each of the M spatial transmission layers is filtered, the first time domain OFDM signal at each of the M spatial transmission layers may be filtered at a first sampling rate. In step 220, before the performing spatial precoding on the filtered first OFDM signal at each of the M spatial transmission layers, the method may further include: performing upsampling on the filtered first time domain OFDM signal at each of the M spatial transmission layers at a second sampling rate, where the second sampling rate is greater than the first sampling rate; and performing, at the second sampling rate, digital frequency conversion on the first time domain OFDM signal that is obtained after upsampling and that is at each of the M spatial transmission layers, so that a center frequency of the first time domain OFDM signal that is obtained after upsampling and that is at each of the M spatial transmission layers is located in a frequency location corresponding to a system broadband to which the first time domain OFDM signal belongs. In step 230, the performing spatial precoding on the filtered first OFDM signal at each of the M spatial transmission layers includes: performing spatial precoding on the first time domain OFDM signal that is obtained after digital frequency conversion and that is at each of the M spatial transmission layers.

Figure 4:
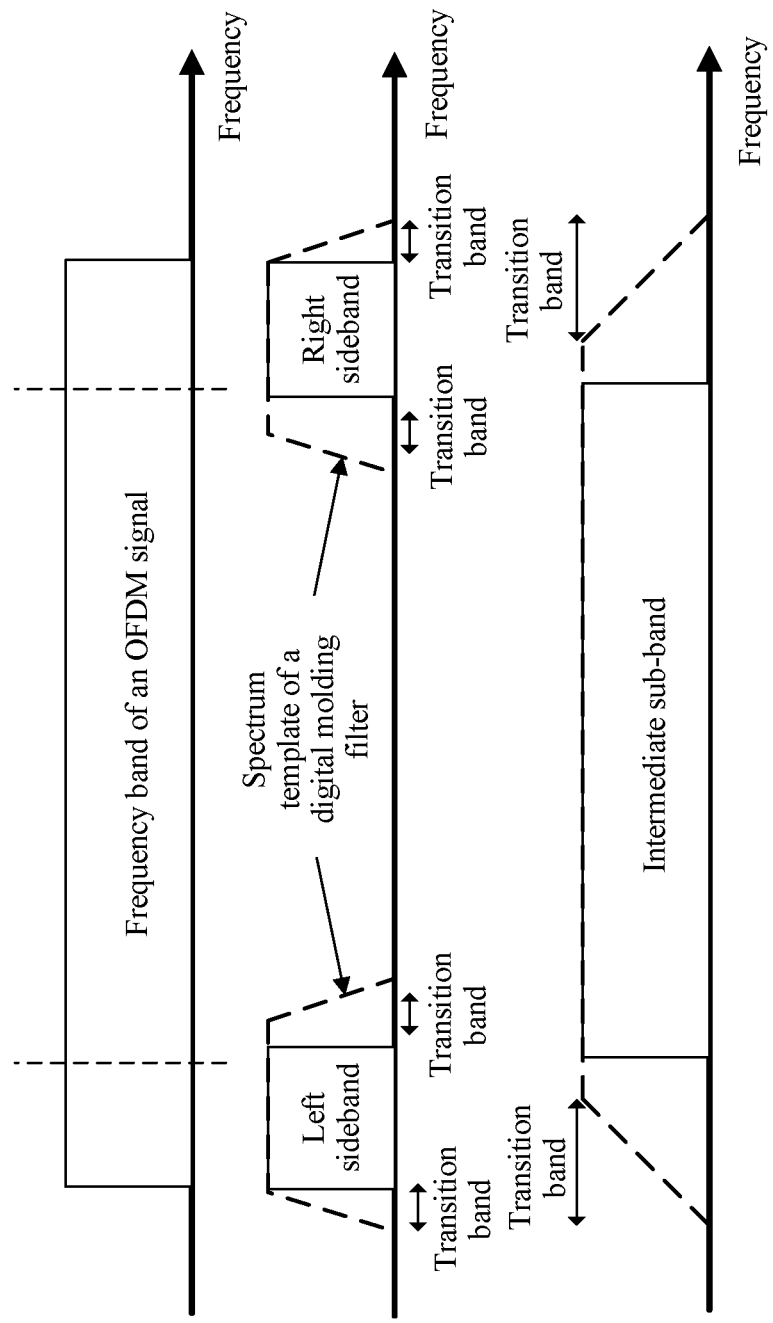
FIG. 4 is a schematic diagram of dividing a frequency domain signal during segment filtering.

Specifically, in a communications system, an OFDM signal on a downlink is usually a broadband OFDM signal. In a transmission process of the broadband OFDM signal, to reduce filtering complexity, a segment filtering method may be used. As shown in FIG. 4, one OFDM broadband signal is divided into three sub-band signals including a left sideband signal, an intermediate sub-band signal, and a right sideband signal in frequency domain. It may be learned from FIG. 4 that the left sideband signal and the right sideband signal are located on an edge, and need to be filtered through higher-order digital molding filtering, to obtain a very narrow transition band, thereby implementing good out-of-band performance. However, because bandwidth of a sideband is relatively small, and a sampling rate is low, a working sampling rate of digital molding filtering may be well reduced, and implementation of filtering is relatively simple. In addition, for the intermediate sub-band, although bandwidth of the intermediate sub-band is relatively wide, and a sampling rate is relatively high, a transition band of the intermediate sub-band may be very wide (for example, the left and right sidebands may be considered as a part of the transition band) because the intermediate sub-band is located in a middle location. Therefore, filtering may be performed through molding filtering of a very low order, and implementation of filtering is relatively simple.

Figure 5:
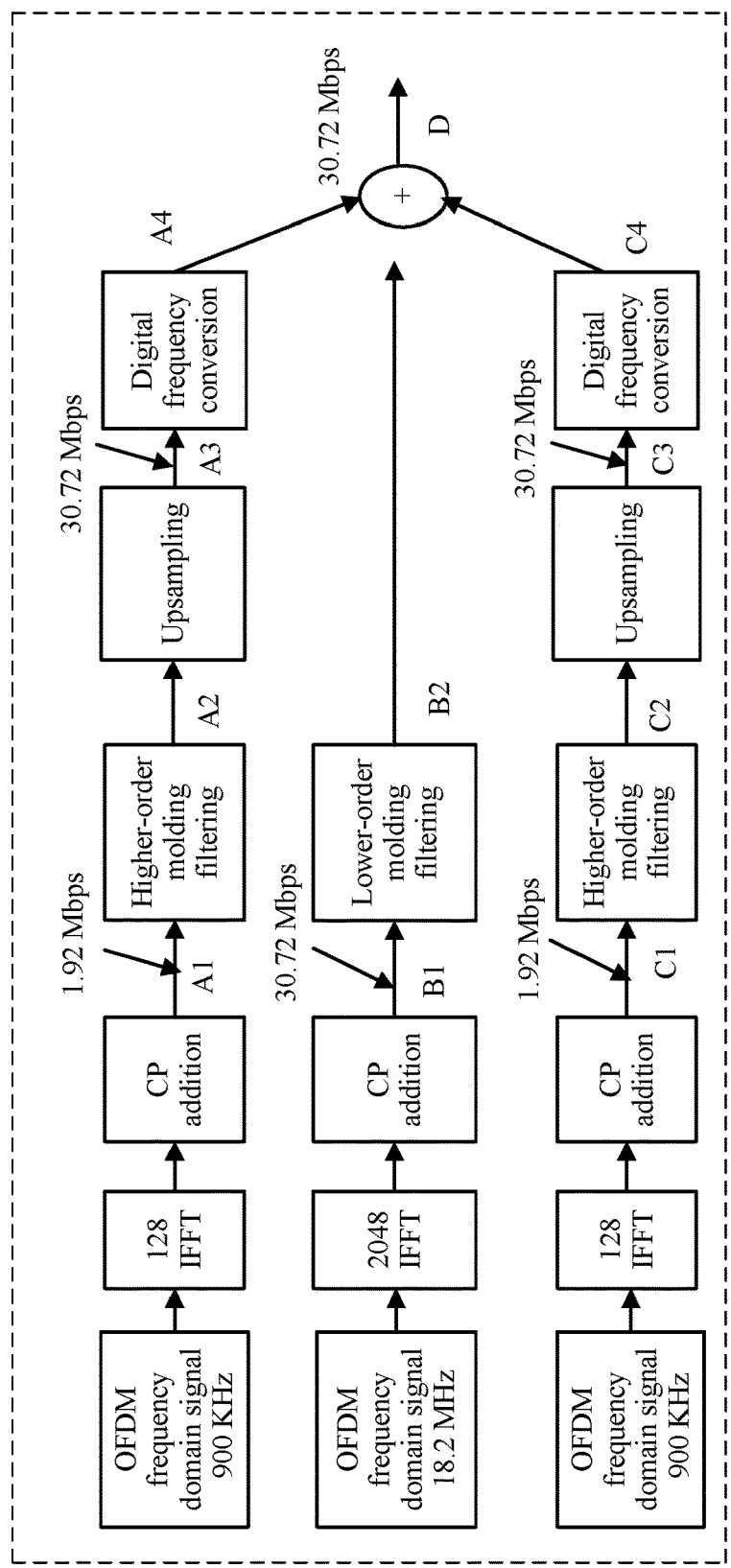
FIG. 5 is a schematic block diagram of a signal transmission method based on segment filtering.

FIG. 5 is a schematic block diagram of transmitting an OFDM signal based on segment filtering.

As shown in FIG. 5, an OFDM bandwidth signal of 20 MHz is divided into: a left sideband signal of 900 KHz, an intermediate signal of 18.2 MHz, and a right sideband signal of 900 KHz. 128-point IFFT transformation is performed on the left sideband signal of 900 KHz at a sampling rate of 1.92 Mbps, to generate a time domain signal. A CP is added to the time domain signal, to generate a signal A1. Higher-order molding filtering is performed on the signal A1, to generate a signal A2. Upsampling is performed on the signal A2 at a sampling rate of 30.72 Mbps, to generate a signal A3. Digital up-conversion processing is performed on the signal A3, to obtain a signal A4. 2048-point IFFT transformation is performed on the intermediate signal of 18.2 MHz at the sampling rate of 30.72 Mbps, to generate a time domain signal. A cyclic prefix is added to the time domain signal, to generate a signal B1. Lower-order molding filtering is performed on the signal B1, to generate a signal B2. 128-point IFFT transformation is performed on the right sideband signal of 900 KHz at the sampling rate of 1.92 Mbps, to generate a time domain signal. A cyclic prefix is added to the time domain signal, to generate a signal C1. Higher-order molding filtering is performed on the signal C1, to generate a signal C2. Upsampling is performed on the signal C2 at the sampling rate of 30.72 Mbps, to generate a signal C3. Digital up-conversion processing is performed on the signal C3, to obtain a signal C4. The signal A4, the signal B2, and the signal C4 are superposed to form a signal D, and the signal D obtained after superposition is used as an F-OFDM signal of the OFDM signal.

Figure 6:
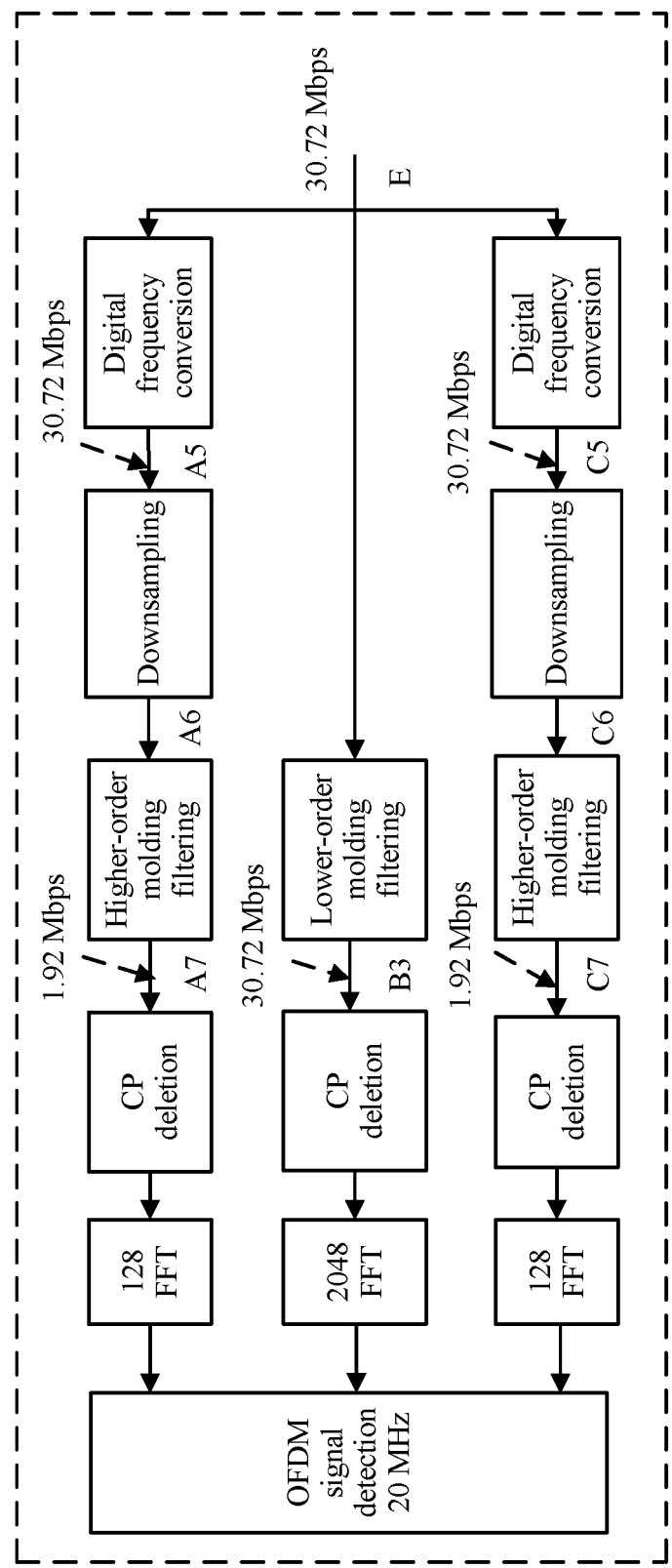
FIG. 6 is a schematic block diagram of a signal receiving method based on segment filtering.

Correspondingly, in an inverse processing process of sending a signal, when a filtered F-OFDM signal whose bandwidth is 20 MHz is received, a process shown in FIG. 6 is performed: performing digital frequency conversion processing on the received F-OFDM signal whose bandwidth is 20 MHz, to obtain a left sideband signal A5. Downsampling is performed on the signal A5 at the sampling rate of 1.92 Mbps, to generate a signal A6. The signal A6 is filtered through higher-order digital molding filtering that is used when the left sideband signal is filtered in the foregoing sending process, to generate a signal A7. CP deletion and 128-point FFT transformation are performed on the signal A7, to restore the left sideband signal of 900 KHz. The received F-OFDM signal whose bandwidth is 20 MHz is directly filtered through lower-order molding filtering that is used when the intermediate signal of 18.2 MHz is filtered in the foregoing sending process, to generate a signal B3. Cyclic prefix deletion and 2048-point FFT transformation are performed on the signal B3, to restore the intermediate signal of 18.2 MHz. Digital frequency conversion processing is performed on the received F-OFDM signal whose bandwidth is 20 MHz, to obtain a right sideband signal C5. Downsampling is performed on the signal C5 at the sampling rate of 1.92 Mbps, to generate a signal C6. The signal C6 is filtered through higher-order molding filtering that is used when the right sideband signal is filtered in the foregoing sending process, to generate a signal C7. Cyclic prefix deletion and 128-point FFT transformation are performed on the signal C7, to restore the left sideband signal of 900 KHz.

With reference to FIG. 4, FIG. 5, and FIG. 6, it may be learned that when a segment filtering-based method is applied to the MIMO system, for the intermediate sub-band of the broadband signal, a lower-order digital molding filter is used in the intermediate sub-band, and therefore complexity of a filtering operation is not high. However, a higher-order digital molding filter is used on a left sideband and a right sideband of the broadband signal. When a quantity of transmit antennas is relatively large, processing on the left sideband and the right sideband on each transmit antenna consumes more processing resources than that on the intermediate sub-band. Therefore, when the foregoing segment filtering method is applied to the MIMO system, filtering operations on the left sideband and the right sideband bring complexity. Because a segment filtering operation is performed on each transmit antenna port, it means that the quantity of filtering operations is still directly proportional to the quantity of transmit antenna ports of the transmitter, and the filtering complexity is relatively high.

In this embodiment of this application, specifically, the first time domain OFDM signal may be a sub-band signal of the broadband OFDM signal. Further, the first time domain OFDM signal may be a sideband signal of the broadband OFDM signal, for example, may be the signal A1 or C1 shown in FIG. 5. In this case, when the first time domain OFDM signal at each of the M spatial transmission layers is filtered, the first time domain OFDM signal at each of the M spatial transmission layers may be filtered at the first sampling rate. Upsampling is performed on the filtered first time domain OFDM signal at each of the M spatial transmission layers at the second sampling rate. Then, digital frequency conversion is performed, at the second sampling rate, on the first time domain OFDM signal that is obtained after upsampling and that is at each of the M spatial transmission layers, so that the center frequency of the first time domain OFDM signal that is obtained after upsampling and that is at each of the M spatial transmission layers is located in a frequency location corresponding to a broadband time domain OFDM signal. Finally, spatial precoding is performed on the first time domain OFDM signal that is obtained after digital frequency conversion and that is at each of the M spatial transmission layers. In other words, a filtering operation is first performed on a time domain OFDM signal (for example, the first time domain OFDM signal) at each of the M spatial transmission layers, and then operations of the upsampling, the digital frequency conversion, and the spatial precoding are performed, so as to map the time domain OFDM signal that is obtained after digital frequency conversion to each transmit antenna port for transmission. In this way, a quantity of filtering operations is directly proportional to a quantity of spatial transmission layers instead of a quantity of transmit antenna ports. Because the quantity of spatial transmission layers is less than or equal to the quantity of transmit antenna ports in the MIMO system, according to the signal transmission method in this embodiment of this application, filtering complexity during signal transmission can be reduced.

In this embodiment of this application, the first time domain OFDM signal may include at least one subcarrier. Further, the first time domain OFDM signal may include several subcarriers on the left or the right of the broadband OFDM signal.

The first sampling rate may be a single sampling rate of the first time domain OFDM signal. The single sampling rate of the first time domain OFDM signal is: $2^n \times$bandwidth of a subcarrier, where $2^n$ is closest to a quantity of subcarriers included in the first time domain OFDM signal, and n is an integer greater than or equal to 1. For example, if bandwidth of the first time domain OFDM signal is 900 KHz, and bandwidth of each subcarrier is 15 KHz, the first time domain OFDM signal includes 60 subcarriers, $2^n$ closest to 60 is 128, and the first sampling rate is: $128 \times 15 = 1920$ kbps=1.92 Mbps.

Herein, the upsampling means that the filtered first time domain OFDM signal is sampled, and a sampling rate of the sampled signal is greater than a sampling rate of the filtered signal. A single sampling rate of a signal that is finally mapped to an antenna port is the same as a single sampling rate of the broadband OFDM signal.

Herein, the digital frequency conversion means that spectrum shifting is performed on a signal that is obtained after upsampling, to shift the signal to a spectrum location corresponding to the broadband OFDM signal.

Optionally, when spatial precoding is performed on the filtered first time domain OFDM signal at each of the M spatial transmission layers, and the filtered first time domain OFDM signal at each of the M spatial transmission layers is mapped to the $N_t$ transmit antenna ports, the filtered first time domain OFDM signal at an $i^{th}$ spatial transmission layer in the M spatial transmission layers may be separately mapped to the $N_t$ transmit antenna ports by using a time domain precoding vector $W_i$ on first filtering bandwidth, where i=1, 2, . . . , M, and i represents an index of the M spatial transmission layers.

Specifically, the first time domain OFDM signal at each of the M spatial transmission layers occupies the entire first filtering bandwidth. In addition, on the first filtering bandwidth, a same spatial precoding vector is used to perform precoding on the first time domain OFDM signal at the spatial transmission layer.

In the following, an example in which the first time domain OFDM signal is a sub-band signal whose bandwidth is 900 KHz in an OFDM bandwidth signal of 20 MHZ is used to describe in detail the signal transmission method in this embodiment of this application. For ease of description, the first time domain OFDM signal herein may be referred to as a first sub-band signal. In addition, the OFDM bandwidth signal of 20 MHZ may further include a second sub-band signal whose bandwidth is 900 KHz and a third sub-band signal whose bandwidth is 18.2 MHz.

Figure 7A:
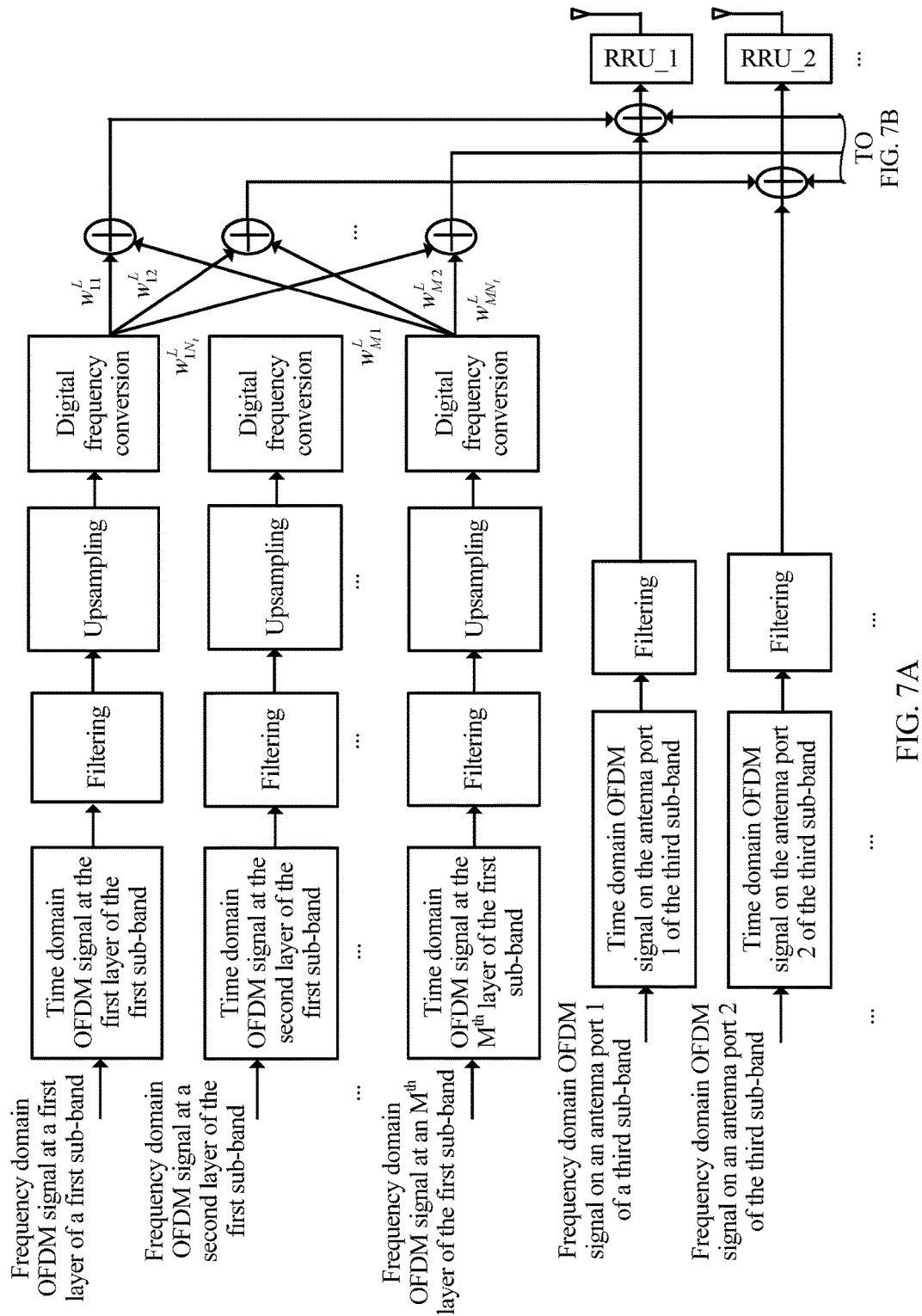
FIG. 7A and FIG. 7B are a schematic block diagram of a signal transmission method according to an embodiment of this application.
Figure 7B:
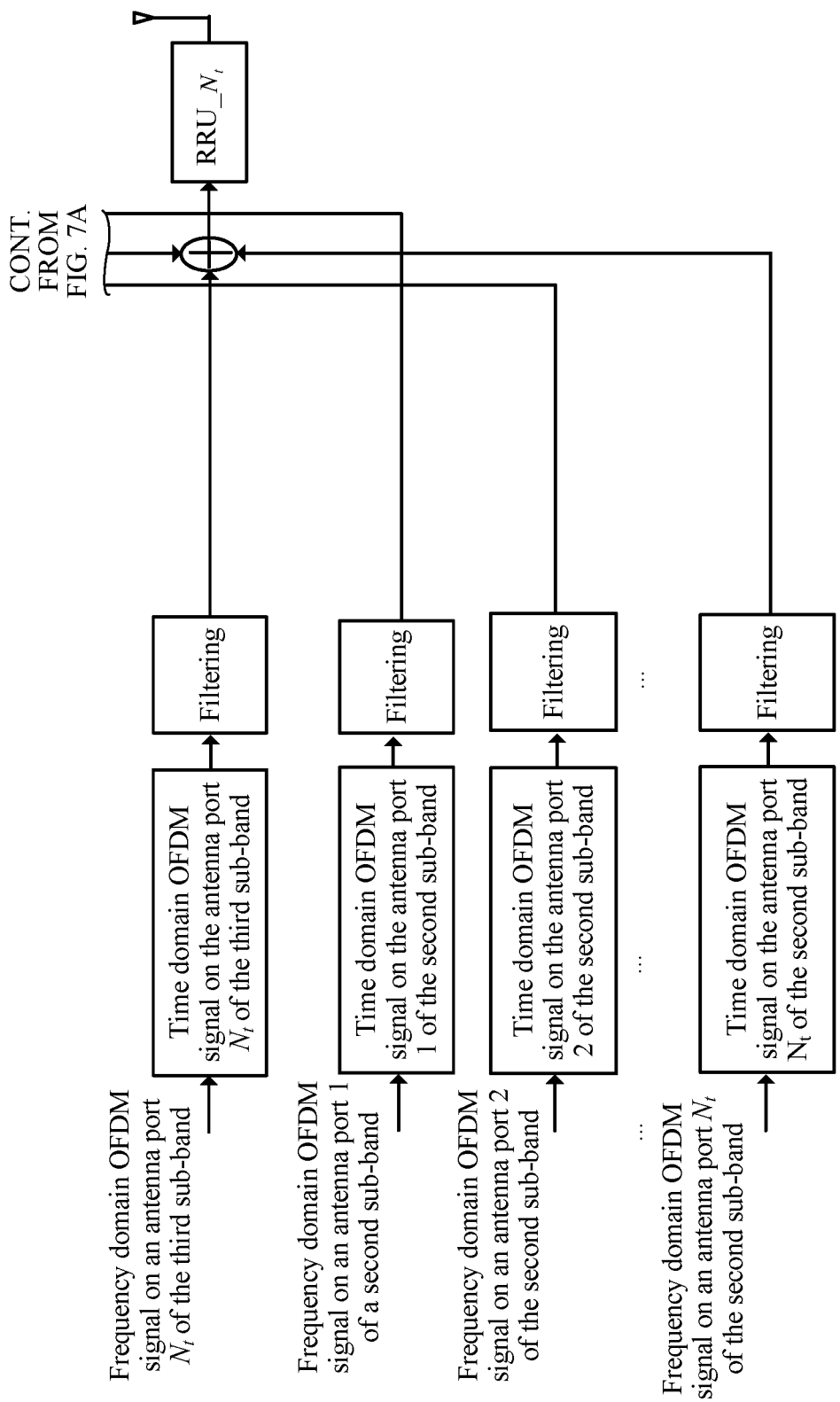

As shown in FIG. 7A and FIG. 7B, for a first sub-band, a transmitter of a network device (for example, the network device 101) first generates, based on an OFDM frequency domain signal at each spatial transmission layer (referred to as "layer" in FIG. 7A and FIG. 7B) of the first sub-band, a time domain OFDM signal corresponding to the spatial transmission layer. Filtering (for example, higher-order digital molding filtering) is performed on the time domain OFDM signal at each of the M spatial transmission layers at the sampling rate of 1.92 Mbps (an example of the first sampling rate). Then, upsampling is performed on the filtered time domain OFDM signal at each of the M spatial transmission layers at the sampling rate of 30.72 Mbps (an example of the second sampling rate), and digital frequency conversion is performed on the sampled time domain OFDM signal. Finally, spatial precoding is performed, by using a precoding vector $W_i^L = [w_{i1}^L \ w_{i2}^L \ \ldots \ w_{iN_t}^L]$, on the time domain OFDM signal that is obtained after digital frequency conversion and that is at each of the M spatial transmission layers, and the time domain OFDM signal that is obtained after digital frequency conversion and that is at each of the M spatial transmission layers is mapped to each transmit antenna port.

For a second sub-band of 900 KHz, the transmitter of the network device first generates, based on the frequency domain OFDM signal on each antenna port, a time domain OFDM signal corresponding to the antenna port, and then filtering (for example, higher-order digital molding filtering) is performed on the time domain OFDM signal on each antenna port. For a third sub-band of 18.2 MHz, the transmitter of the network device first generates, based on the frequency domain OFDM signal on each antenna port, a time domain OFDM signal corresponding to the antenna port, and then filtering (for example, lower-order filtering) is performed on the time domain OFDM signal on each antenna port. Finally, after data on transmit antenna ports is superposed, a complete broadband signal is formed, and is output to a corresponding RRU, and the RRU transmits data on each transmit antenna port by using a corresponding transmit antenna.

For generating a time domain signal from a frequency domain signal, refer to the method shown in FIG. 5. For brevity, details are not described herein again.

The second sampling rate may be a single sampling rate of the second sub-band signal. The single sampling rate of the second sub-band signal is: $2^n \times$bandwidth of a subcarrier, where $2^n$ is closest to a quantity of subcarriers included in the second sub-band signal, and n is an integer greater than or equal to 1. For example, if bandwidth of the second sub-band signal is 18.2 MHz, and bandwidth of each subcarrier is 15 KHz, the second sub-band signal includes 1213 subcarriers, $2^n$ closest to 60 is 2048, and the second sampling rate is: $2048 \times 15 = 30720$ kbps=30.72 Mbps.

It should be further understood that a precoding vector $W_i^L = [w_{i1}^L \ w_{i2}^L \ \ldots \ w_{iN_t}^L]$ herein is a precoding vector that is obtained after operations of upsampling and spectrum shifting are performed on a precoding vector $W_i = [w_{i1} \ w_{i2} \ \ldots \ w_{iN_t}]$.

It should be noted that when data on antenna ports is superposed, it needs to be ensured that the superposed first sub-band signal, second sub-band signal, and third sub-band signal are strictly synchronized in terms of time.

It should be understood that the foregoing first sub-band signal may include several subcarriers on the left of the OFDM bandwidth signal of 20 MHz, the second sub-band signal may include several subcarriers on the right, and remaining subcarriers may be used as the third sub-band signals.

In this embodiment of this application, operations of filtering, upsampling, and digital frequency conversion are first performed on the first sub-band signal, then precoding is performed on the first sub-band signal that is obtained after digital frequency conversion, and the signal is mapped to each transmit antenna port, so that a quantity of filtering operations on the first sub-band signal is directly proportional to a quantity of spatial transmission layers instead of a quantity of transmit antenna ports. Because the quantity of spatial transmission layers is less than or equal to the quantity of transmit antenna ports in the MIMO system, according to the time domain OFDM signal transmission method in this embodiment of this application, filtering complexity during signal transmission can be reduced.

Optionally, the method may further include: filtering a second time domain OFDM signal at each of N spatial transmission layers at a third sampling rate, where N is an integer greater than or equal to 1; performing upsampling on the filtered second time domain OFDM signal at each of the N spatial transmission layers at a fourth sampling rate, where the fourth sampling rate is greater than the third sampling rate; performing, at the fourth sampling rate, digital frequency conversion on the second time domain OFDM signal that is obtained after upsampling and that is at each of the N spatial transmission layers, so that a center frequency of the second time domain OFDM signal that is obtained after upsampling and that is at each of the N spatial transmission layers is located in a frequency location corresponding to a system broadband to which the second time domain OFDM signal belongs;

performing spatial precoding on the second time domain OFDM signal that is obtained after digital frequency conversion and that is at each of the N spatial transmission layers, and mapping the filtered second time domain OFDM signal at each of the N spatial transmission layers to the $N_t$ transmit antenna ports; and the superposing and transmitting the first time domain OFDM signals that are at the M spatial transmission layers and that are mapped to all the $N_t$ transmit antenna ports includes: superposing and transmitting the first time domain OFDM signals that are at the M spatial transmission layers and that are mapped to all the $N_t$ transmit antenna ports and the second time domain OFDM signals at the N spatial transmission layers.

In this embodiment of this application, the second time domain OFDM signal may be another sideband signal of the broadband OFDM signal. For example, the second time domain OFDM signal may be a second sideband signal in FIG. 7A and FIG. 7B. For a specific operation on the second time domain OFDM signal, refer to the foregoing operation on the first time domain OFDM signal. For details, refer to the operation on the first sub-band signal in FIG. 7A and FIG. 7B. For brevity, details are not described herein again.

It should be noted that M and N herein may be the same, or may be different. This is not limited in this embodiment of this application. Bandwidth of the first time domain OFDM signal and bandwidth of the second time domain OFDM signal may be equal, or may be unequal.

Herein, for the third sampling rate, refer to the foregoing description of the first sampling rate. For brevity, details are not described herein again.

Herein, upsampling means that a filtered signal is sampled, and a sampling rate of the sampled signal is greater than a sampling rate of the filtered signal. A single sampling rate of the second time domain OFDM signal that is finally mapped to an antenna port is the same as a single sampling rate of the broadband OFDM signal.

Herein, digital frequency conversion means that spectrum shifting is performed on a signal that is obtained after upsampling, to shift the signal to a spectrum location corresponding to the broadband signal.

Optionally, the performing spatial precoding on the second time domain OFDM signal that is obtained after digital frequency conversion and that is at each of the N spatial transmission layers, and mapping the filtered second time domain OFDM signal at each of the N spatial transmission layers to the $N_t$ transmit antenna ports includes: separately mapping, by using a time domain precoding vector $W_j$ on second filtering bandwidth, the filtered second time domain OFDM signal at a $j^{th}$ spatial transmission layer in the N spatial transmission layers to the $N_t$ transmit antenna ports, where j=1, 2, . . . , N, and j represents an index of the N spatial transmission layers.

Specifically, data at each of the N spatial transmission layers occupies the entire second filtering bandwidth. In addition, on the second filtering bandwidth, a same spatial precoding vector is used to perform precoding on the second time domain OFDM signal at each spatial transmission layer.

Optionally, the method further includes: filtering a third time domain OFDM signal corresponding to each of the $N_t$ transmit antenna ports at a fifth sampling rate, where the fifth sampling rate is greater than the first sampling rate and/or the third sampling rate; and the superposing and transmitting the first time domain OFDM signals that are at the M spatial transmission layers and that are mapped to all the $N_t$ transmit antenna ports includes: superposing and transmitting the first time domain OFDM signals that are at the M spatial transmission layers and that are mapped to all the $N_t$ transmit antenna ports, the second time domain OFDM signals at the N spatial transmission layers, and the filtered third time domain OFDM signal.

Specifically, the broadband OFDM signal may include a first time domain OFDM signal and a second time domain OFDM signal, and may further include a third time domain OFDM signal. The third time domain OFDM signal may be an intermediate sub-band signal of the broadband OFDM signal. The third sub-band signal may be a signal that is obtained after precoding and that is mapped to a transmit antenna port. In this case, filtering processing may be performed on the third time domain OFDM signal, that is, filtering processing is performed, on each transmit antenna port, on the third time domain OFDM signal on the transmit antenna port. Lower-order molding filtering may be used in the filtering herein. Then, data that is obtained by mapping the first time domain OFDM signal and the second time domain OFDM signal to a corresponding transmit antenna port and the filtered third time domain OFDM signal on the antenna port are superposed and transmitted.

In the following, an example in which an OFDM signal is an OFDM bandwidth signal of 20 MHz, the first time domain OFDM signal is a sideband OFDM signal (or referred to as the first sub-band signal) of 900 KHz, the second time domain OFDM signal is a sideband OFDM signal (or referred to as the second sub-band signal) of 900 KHz, the third time domain OFDM signal is an intermediate sub-band signal (or referred to as the third sub-band signal) of 18.2 MHz, and N=M is used to describe in detail the signal transmission method provided in this embodiment of this application with reference to FIG. 8A and FIG. 8B.

Figure 8A:
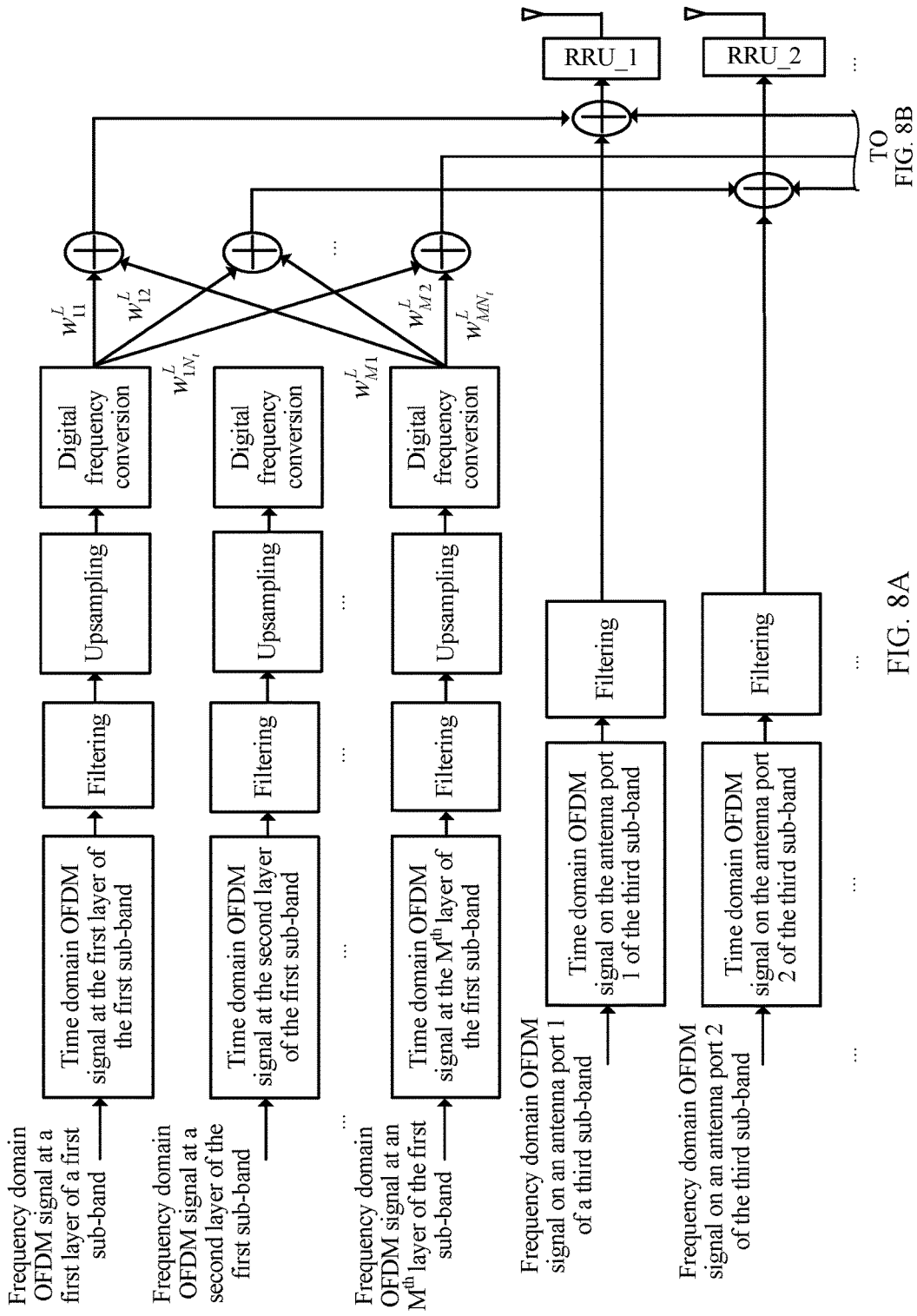
FIG. 8A and FIG. 8B are a schematic block diagram of a signal transmission method according to an embodiment of this application.
Figure 8B:
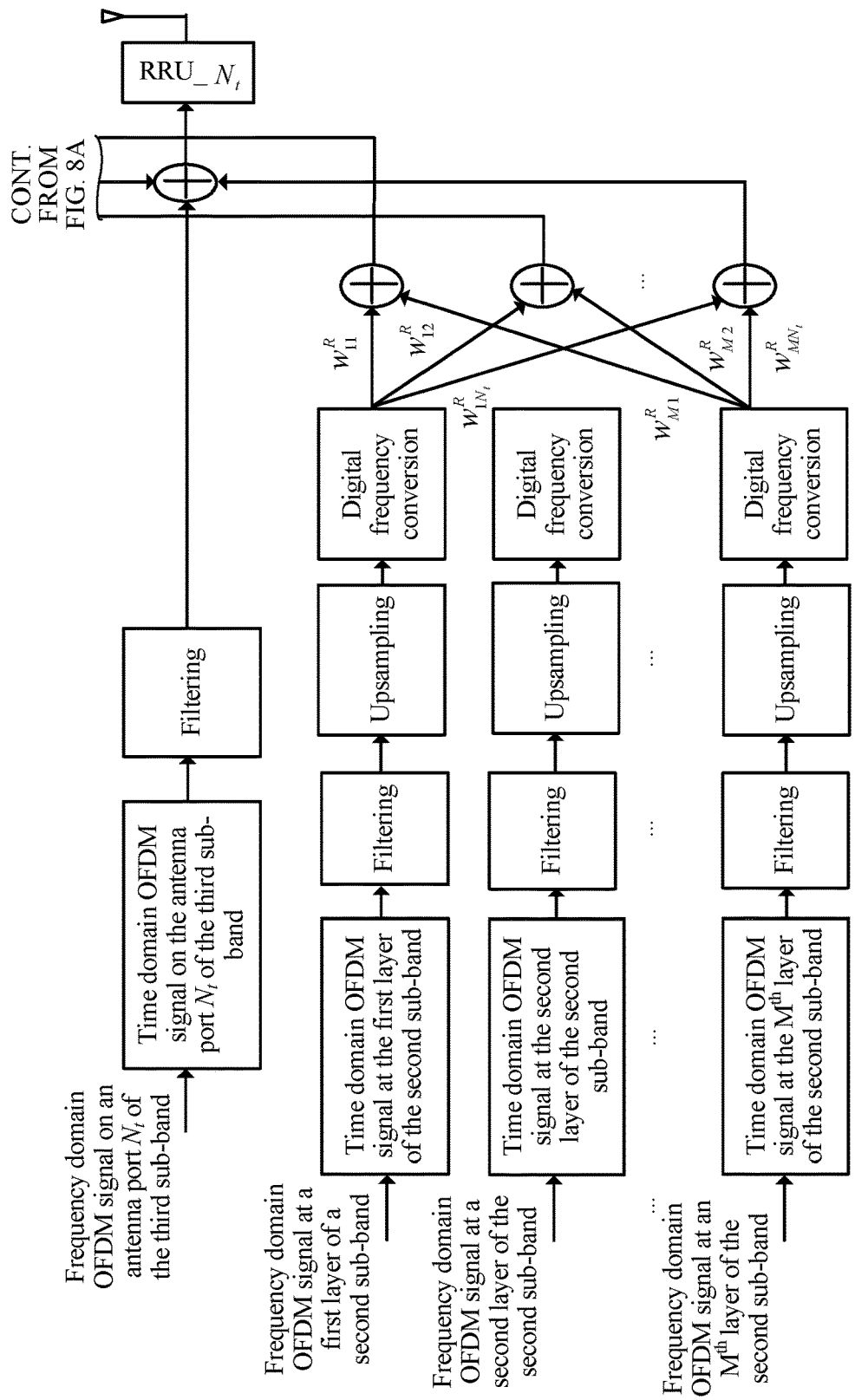

As shown in FIG. 8A and FIG. 8B, for a second sub-band, a transmitter of a network device (for example, the network device 101) first generates, based on an OFDM frequency domain signal at each spatial transmission layer (referred to as "layer" in FIG. 8A and FIG. 8B) of the second sub-band, a time domain OFDM signal corresponding to the spatial transmission layer. The transmitter of the network device performs filtering (for example, higher-order digital molding filtering) on the time domain OFDM signal at each of the M spatial transmission layers at the sampling rate of 1.92 Mbps. Then, upsampling is performed on the filtered OFDM signal at each of the N spatial transmission layers at the sampling rate of 30.72 Mbps, and digital frequency conversion is performed on the sampled time domain OFDM signal. Finally, spatial precoding is performed, by using a precoding vector $W_j=[w_{j1}\ w_{j2}\ \ldots\ w_{jN_t}]$, on the OFDM signal that is obtained after digital frequency conversion and that is at each of the M spatial transmission layers, and the OFDM signal that is obtained after digital frequency conversion and that is at each of the M spatial transmission layers is mapped to each transmit antenna port. For the first sub-band signal, refer to the operation on the first sub-band signal in FIG. 7A and FIG. 7B. For brevity, details are not described herein again. For the third sub-band signal, refer to the operation on the third sub-band signal in FIG. 7A and FIG. 7B. For brevity, details are not described herein again. Finally, after data on transmit antenna ports is superposed, a complete broadband signal is formed, and is output to a corresponding RRU, and the RRU transmits data on each transmit antenna port by using a corresponding transmit antenna.

For generating a time domain signal from a frequency domain signal, refer to the method shown in FIG. 5. For brevity, details are not described herein again.

The fifth sampling rate may be a single sampling rate of the third sub-band signal. The single sampling rate of the third frequency band signal is: $2^n \times$bandwidth of a subcarrier, where $2^n$ is closest to a quantity of subcarriers included in the third frequency band signal, and n is an integer greater than or equal to 1. For example, if bandwidth of the third frequency band signal is 18.2 MHz, and bandwidth of each subcarrier is 15 KHz, the third frequency band signal includes 1213 subcarriers, $2^n$ closest to 60 is 2048, and the fifth sampling rate is: 2048×15=30720 kbps=30.72 Mbps.

It should be understood that $W_j=[w_{j1}^R\ w_{j2}^R\ \ldots\ w_{jN_t}^R]$ herein is a precoding vector that is obtained after operations of upsampling and digital frequency conversion are performed on a precoding vector $W_i=[w_{i1}\ w_{i2}\ \ldots\ w_{iN_t}]$.

It should be further understood that different precoding vectors are used on different sub-bands, and therefore, when precoding is performed on the first sub-band signal and the second sub-band signal, used precoding vectors are different.

It should be noted that when data on antenna ports is superposed, it needs to be ensured that the superposed first sub-band signal, second sub-band signal, and third sub-band signal are strictly synchronized in terms of time.

In this embodiment of this application, operations of filtering, upsampling, and digital frequency conversion are performed on the first sub-band signal and the second sub-band signal, then the first sub-band signal and the second sub-band signal that are obtained after digital frequency conversion are mapped to each transmit antenna port, so that a quantity of filtering operations on each of the first sub-band signal and the second sub-band signal is directly proportional to a quantity of spatial transmission layers instead of a quantity of transmit antenna ports. Because the quantity of spatial transmission layers is less than or equal to the quantity of transmit antenna ports in the MIMO system, according to the signal transmission method in this embodiment of this application, filtering complexity during signal transmission can be reduced.

It should be noted that, when the signal transmission method according to this embodiment of this application is described, the related "sub-band" is a sub-band in a broadband, and is not a sub-band in a real meaning. In other words, the related broadband may be a real sub-band in the MIMO system, or a sub-band that is well known to a person skilled in the art. In this embodiment of this application, only a sub-band in the MIMO system is used as an example for description. If the MIMO system includes a plurality of sub-bands (for example, a plurality of sub-bands of 20 MHz), for an operation on a time domain OFDM signal on each sub-band, refer to the signal transmission method in the foregoing description. For brevity, details are not described herein again.

The foregoing describes in detail the signal transmission method according to the embodiment of this application with reference to FIG. 1 to FIG. 8A and FIG. 8B. The following describes a signal transmission apparatus according to embodiments of this application with reference to FIG. 9 to FIG. 10.

Figure 9:
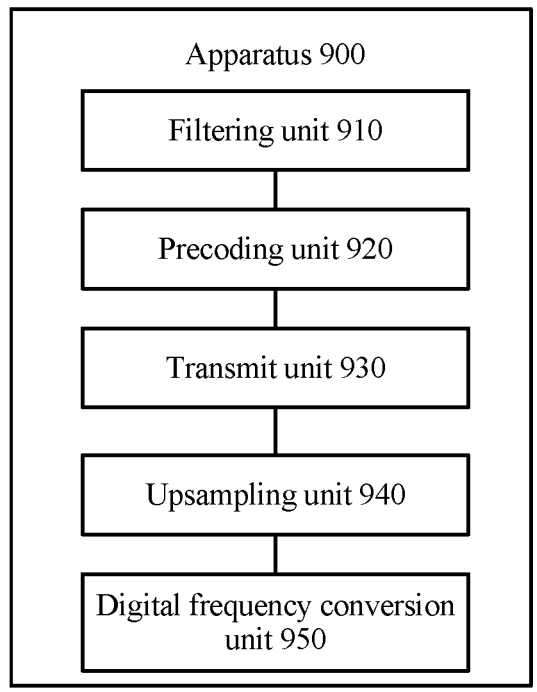
FIG. 9 is a schematic block diagram of a signal transmission apparatus according to an embodiment of this application.

FIG. 9 shows a signal transmission apparatus 900 according to an embodiment of this application. As shown in FIG. 9, the apparatus 900 includes a filtering unit 910, a precoding unit 920, and a transmit unit 930.

The filtering unit 910 is configured to filter a first time domain OFDM signal at each of M spatial transmission layers, where M is an integer greater than or equal to 1.

The precoding unit 920 is configured to: perform spatial precoding on the first time domain OFDM signal that is filtered by the filtering unit 910 and that is at each of the M spatial transmission layers, and map the filtered first time domain OFDM signal at each of the M spatial transmission layers to each of $N_t$ transmit antenna ports, where $N_t$ is an integer greater than or equal to M.

The transmit unit 930 is configured to superpose and transmit the first time domain OFDM signals that are at the M spatial transmission layers and that are mapped by the precoding unit 920 to all the $N_t$ transmit antenna ports.

It should be understood that the foregoing filtering unit and the precoding unit may be implemented by using software, or may be implemented by using hardware that can be configured, such as a processor, or may be implemented by using a combination of software and hardware that can be configured, for example, may be implemented by a processor by using a software algorithm that can be configured. This is not limited in this embodiment of this application.

According to the signal transmission apparatus in this embodiment of this application, a filtering operation is first performed on a time domain OFDM signal (for example, the first time domain OFDM signal) at each of the M spatial transmission layers, then spatial precoding is performed, and the filtered time domain OFDM signal at the spatial transmission layer is mapped to each transmit antenna port for transmission. In this way, a quantity of filtering operations is directly proportional to a quantity of spatial transmission layers instead of a quantity of transmit antenna ports. Because the quantity of spatial transmission layers is less than or equal to the quantity of transmit antenna ports in a MIMO system, according to the signal transmission apparatus in this embodiment of this application, filtering complexity during signal transmission can be reduced.

Optionally, the filtering unit 910 is specifically configured to filter the first time domain OFDM signal at each of the M spatial transmission layers at a first sampling rate.

The apparatus further includes:

an upsampling unit 940, configured to perform upsampling on the filtered first time domain OFDM signal at each of the M spatial transmission layers at a second sampling rate, where the second sampling rate is greater than the first sampling rate; and a digital frequency conversion unit 950, configured to perform, at the second sampling rate, digital frequency conversion on the first time domain OFDM signal that is obtained after upsampling and that is at each of the M spatial transmission layers, so that a center frequency of the first time domain OFDM signal that is obtained after upsampling and that is at each of the M spatial transmission layers is located in a frequency location corresponding to a system broadband to which the first time domain OFDM signal belongs.

The precoding unit 920 is specifically configured to:

perform spatial precoding on the first time domain OFDM signal that is obtained after digital frequency conversion and that is at each of the M spatial transmission layers.

Optionally, the filtering unit 910 is further configured to filter a second time domain OFDM signal at each of N spatial transmission layers at a third sampling rate, where N is an integer greater than or equal to 1.

The upsampling unit 940 is further configured to perform upsampling on the filtered second time domain OFDM signal at each of the N spatial transmission layers at a fourth sampling rate, where the fourth sampling rate is greater than the third sampling rate.

The digital frequency conversion unit 950 is further configured to perform, at the fourth sampling rate, digital frequency conversion on the second time domain OFDM signal that is obtained after upsampling and that is at each of the N spatial transmission layers, so that a center frequency of the second time domain OFDM signal that is obtained after upsampling and that is at each of the N spatial transmission layers is located in a frequency location corresponding to a system broadband to which the second time domain OFDM signal belongs.

The precoding unit 920 is specifically configured to: perform spatial precoding on the second time domain OFDM signal that is obtained after digital frequency conversion and that is at each of the N spatial transmission layers, and map the filtered second time domain OFDM signal at each of the N spatial transmission layers to the $N_t$ transmit antenna ports.

The transmit unit 910 is specifically configured to superpose and transmit the first time domain OFDM signals that are at the M spatial transmission layers and that are mapped to all the $N_t$ transmit antenna ports and the second time domain OFDM signals at the N spatial transmission layers.

Optionally, the filtering unit 910 is further configured to filter a third time domain OFDM signal corresponding to each of the $N_t$ transmit antenna ports at a fifth sampling rate, where the fifth sampling rate is greater than the first sampling rate and/or the third sampling rate.

The transmit unit 930 is specifically configured to superpose and transmit the first time domain OFDM signals that are at the M spatial transmission layers and that are mapped to all the $N_t$ transmit antenna ports, the second time domain OFDM signals at the N spatial transmission layers, and the filtered third time domain OFDM signal.

Optionally, the precoding unit 920 is specifically configured to separately map, by using a time domain precoding vector $W_i$ on first filtering bandwidth, the filtered first time domain OFDM signal at an $i^{th}$ spatial transmission layer in the M spatial transmission layers to the $N_t$ transmit antenna ports, where i=1, 2, . . . , M, and i represents an index of the M spatial transmission layers.

Optionally, the precoding unit 920 is specifically configured to separately map, by using a time domain precoding vector $W_j$ on second filtering bandwidth, the filtered second time domain OFDM signal at a $i^{th}$ spatial transmission layer in the N spatial transmission layers to the $N_t$ transmit antenna ports, where j=1, 2, . . . , N, and j represents an index of the N spatial transmission layers.

The apparatus 900 according to this embodiment of this application may be corresponding to the signal transmission method according to the embodiments of this application. In addition, units and/or modules in the apparatus 900 are respectively configured to implement steps of the foregoing signal transmission method. For brevity, details are not described herein.

Figure 10:
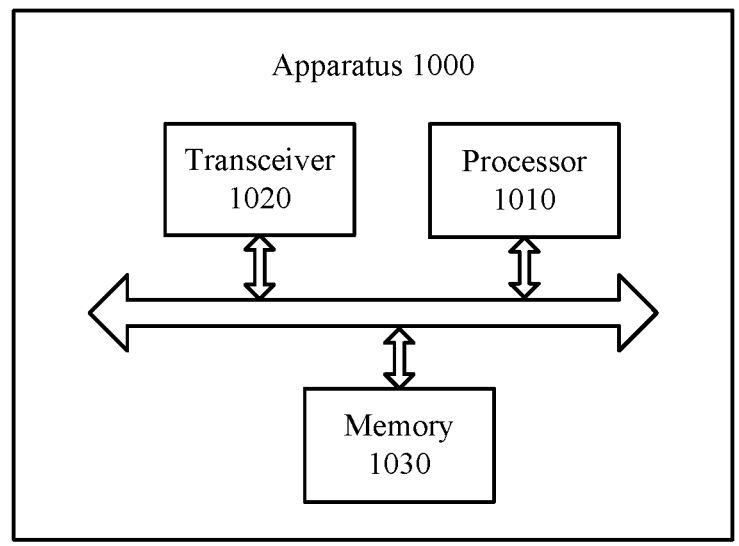
FIG. 10 is a schematic structural diagram of a signal transmission apparatus according to an embodiment of this application.

FIG. 10 shows a signal transmission apparatus 900 according to another embodiment of this application. As shown in FIG. 10, the apparatus 1000 includes a processor 1010, a transceiver 1020, and a memory 1030. The memory 1030 may be configured to store an instruction. The processor 1010 is configured to execute the instruction stored in the memory 1030. When the stored instruction is executed:

The processor 1010 is configured to filter a first time domain OFDM signal at each of M spatial transmission layers, where M is an integer greater than or equal to 1.

The processor 1010 is further configured to: perform spatial precoding on the filtered first time domain OFDM signal at each of the M spatial transmission layers, and map the filtered first time domain OFDM signal at each of the M spatial transmission layers to each of $N_t$ transmit antenna ports, where $N_t$ is an integer greater than or equal to M.

The transceiver 1020 is configured to superpose and transmit the first time domain OFDM signals that are at the M spatial transmission layers and that are mapped to all the $N_t$ transmit antenna ports.

It should be understood that, in this embodiment of this application, the processor 1010 may be a central processing unit (CPU). Alternatively, the processor 1010 may be another general-purpose processor, a signal processor (DSP), an application-specific integrated circuit (ASIC), a field programmable gate array (FPGA), or another programmable logic device, a discrete gate or a transistor logic device, a discrete hardware component, or the like. The general-purpose processor may be a microprocessor or the processor may be any conventional processor, or the like.

The memory 1030 may include a read-only memory and a random access memory, and provide an instruction and data for the processor 1010. A part of the processor 1010 may further include a non-volatile random access memory. For example, the processor 1010 may further store device type information.

In an implementation process, each step of the foregoing method may be completed by using an integrated logical circuit of hardware in the processor 1010 or an instruction in a form of software. The steps of the signal transmission method in the embodiments of this application may be directly performed by a hardware processor, or may be performed by using a combination of hardware in the processor and a software module. The software module may be located in a mature storage medium in the field, such as a random access memory, a flash memory, a read-only memory, a programmable read-only memory, an electrically-erasable programmable memory, or a register. The storage medium is located in the memory 1030, and the processor 1010 reads information in the memory 1030 and implements the steps of the foregoing method in combination with hardware of the processor 1010. To avoid repetition, details are not described herein.

According to the signal transmission apparatus in this embodiment of this application, a filtering operation is first performed on a time domain OFDM signal (for example, the first time domain OFDM signal) at each of the M spatial transmission layers, then spatial precoding is performed, and the filtered time domain OFDM signal at the spatial transmission layer is mapped to each transmit antenna port for transmission. In this way, a quantity of filtering operations is directly proportional to a quantity of spatial transmission layers instead of a quantity of transmit antenna ports. Because the quantity of spatial transmission layers is less than or equal to the quantity of transmit antenna ports in a MIMO system, according to the signal transmission apparatus in this embodiment of this application, filtering complexity during signal transmission can be reduced.

Optionally, the processor 1010 is specifically configured to:

filter the first time domain OFDM signal at each of the M spatial transmission layers at a first sampling rate;

perform upsampling on the filtered first time domain OFDM signal at each of the M spatial transmission layers at a second sampling rate, where the second sampling rate is greater than the first sampling rate; and perform, at the second sampling rate, digital frequency conversion on the first time domain OFDM signal that is obtained after upsampling and that is at each of the M spatial transmission layers, so that a center frequency of the first time domain OFDM signal that is obtained after upsampling and that is at each of the M spatial transmission layers is located in a frequency location corresponding to a system broadband to which the first time domain OFDM signal belongs; and perform spatial precoding on the first time domain OFDM signal that is obtained after digital frequency conversion and that is at each of the M spatial transmission layers.

Optionally, the processor 1010 is further configured to:
filter a second time domain OFDM signal at each of N spatial transmission layers at a third sampling rate, where N is an integer greater than or equal to 1;

perform upsampling on the filtered second time domain OFDM signal at each of the N spatial transmission layers at a fourth sampling rate, where the fourth sampling rate is greater than the third sampling rate;

perform, at the fourth sampling rate, digital frequency conversion on the second time domain OFDM signal that is obtained after upsampling and that is at each of the N spatial transmission layers, so that a center frequency of the second time domain OFDM signal that is obtained after upsampling and that is at each of the N spatial transmission layers is located in a frequency location corresponding to a system broadband to which the second time domain OFDM signal belongs; and perform spatial precoding on the second time domain OFDM signal that is obtained after digital frequency conversion and that is at each of the N spatial transmission layers, and map the filtered second time domain OFDM signal at each of the N spatial transmission layers to the $N_t$ transmit antenna ports.

The transceiver 1020 is specifically configured to superpose and transmit the first time domain OFDM signals that are at the M spatial transmission layers and that are mapped to all the $N_t$ transmit antenna ports and the second time domain OFDM signals at the N spatial transmission layers.

Optionally, the processor 1010 is further configured to filter a third time domain OFDM signal corresponding to each of the $N_t$ transmit antenna ports at a fifth sampling rate, where the fifth sampling rate is greater than the first sampling rate and/or the third sampling rate.

The transceiver 1020 is specifically configured to superpose and transmit the first time domain OFDM signals that are at the M spatial transmission layers and that are mapped to all the $N_t$ transmit antenna ports, the second time domain OFDM signals at the N spatial transmission layers, and the filtered third time domain OFDM signal.

Optionally, the processor 1010 is specifically configured to separately map, by using a time domain precoding vector $W_i$ on first filtering bandwidth, the filtered first time domain OFDM signal at an $i^{th}$ spatial transmission layer in the M spatial transmission layers to the $N_t$ transmit antenna ports, where i=1, 2, . . . , M, and i represents an index of the M spatial transmission layers.

Optionally, the processor 1010 is specifically configured to separately map, by using a time domain precoding vector $W_j$ on second filtering bandwidth, the filtered second time domain OFDM signal at a $j^{th}$ spatial transmission layer in the N spatial transmission layers to the $N_t$ transmit antenna ports, where j=1, 2, . . . , N, and j represents an index of the N spatial transmission layers.

The apparatus 1000 according to this embodiment of this application may be corresponding to the signal transmission method according to the embodiments of this application. In addition, units and/or modules in the apparatus 1000 are respectively configured to implement steps in FIG. 2 or in the foregoing signal transmission method. For brevity, details are not described herein.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments of this application.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The software product is stored in a storage medium and includes several instructions for instructing a computer device (which may be a personal computer, a server, a network device, or the like) to perform all or some of the steps of the methods described in the embodiments of this application. The storage medium includes: any medium that can store program code, such as a USB flash drive, a removable hard disk, a read-only memory (ROM), a random access memory (RAM), a magnetic disk, or an optical disc.

The foregoing descriptions are merely specific embodiments of this application, but are not intended to limit the protection scope of this application. Any modification or replacement readily figured out by a person skilled in the art within the technical scope disclosed in this application shall fall within the protection scope of this application. Therefore, the protection scope of this application shall be subject to the protection scope of the claims.

What is claimed is:

1. A signal transmission method, comprising:
   filtering a first time domain orthogonal frequency division multiplexing (OFDM) signal at each of M spatial transmission layers, wherein M is an integer greater than or equal to 1;
   performing spatial precoding on the filtered first time domain OFDM signal at each of the M spatial transmission layers;
   mapping the filtered first time domain OFDM signal at each of the M spatial transmission layers to each of $N_t$ transmit antenna ports, wherein $N_t$ is an integer greater than or equal to M; and
   superposing and transmitting the first time domain OFDM signals that are at the M spatial transmission layers and that are mapped to all $N_t$ the transmit antenna ports;
   wherein the filtering a first time domain OFDM signal at each of M spatial transmission layers comprises:
   filtering the first time domain OFDM signal at each of the M spatial transmission layers at a first sampling rate;
   before the performing spatial precoding on the filtered first domain OFDM signal at each of the M spatial transmission layers, the method further comprises:
   performing upsampling on the filtered first time domain OFDM signal at each of the M spatial transmission layers at a second sampling rate, wherein the second sampling rate is greater than the first sampling rate; and
   performing, at the second sampling rate, digital frequency conversion on the first time domain OFDM signal that is obtained after upsampling and that is at each of the M spatial transmission layers, so that a center frequency of the first time domain OFDM signal that is obtained after upsampling and that is at each of the M spatial transmission layers is located in a frequency location corresponding to a system broadband to which the first time domain OFDM signal belongs; and
   the performing spatial precoding on the filtered first domain OFDM signal at each of the M spatial transmission layers comprises:
   performing spatial precoding on the first time domain OFDM signal that is obtained after digital frequency conversion and that is at each of the M spatial transmission layers.

2. The method according to claim 1, wherein the method further comprises:
   filtering a second time domain OFDM signal at each of N spatial transmission layers at a third sampling rate, wherein N is an integer greater than or equal to 1;
   performing upsampling on the filtered second time domain OFDM signal at each of the N spatial transmission layers at a fourth sampling rate, wherein the fourth sampling rate is greater than the third sampling rate;
   performing, at the fourth sampling rate, digital frequency conversion on the second time domain OFDM signal that is obtained after upsampling and that is at each of the N spatial transmission layers, so that a center frequency of the second time domain OFDM signal that is obtained after upsampling and that is at each of the N spatial transmission layers is located in a frequency location corresponding to a system broadband to which the second time domain OFDM signal belongs;
   performing spatial precoding on the second time domain OFDM signal that is obtained after digital frequency conversion and that is at each of the N spatial transmission layers, and mapping the filtered second time domain OFDM signal at each of the N spatial transmission layers to each of the $N_t$ transmit antenna ports; and
   the superposing and transmitting the first time domain OFDM signals that are at the M spatial transmission layers and that are mapped to all the $N_t$ transmit antenna ports comprises:
   superposing and transmitting the first time domain OFDM signals that are at the M spatial transmission layers and that are mapped to all the $N_t$ transmit antenna ports and second time domain OFDM signals at the N spatial transmission layers.

3. The method according to claim 2, wherein the method further comprises:

filtering a third time domain OFDM signal corresponding to each of the $N_t$ transmit antenna ports at a fifth sampling rate, wherein the fifth sampling rate is greater than the first sampling rate, the third sampling rate, or both; and the superposing and transmitting the first time domain OFDM signals that are at the M spatial transmission layers and that are mapped to all the $N_t$ transmit antenna ports comprises:

superposing and transmitting the first time domain OFDM signals that are at the M spatial transmission layers and that are mapped to all the $N_t$ transmit antenna ports, the second time domain OFDM signals at the N spatial transmission layers, and the filtered third time domain OFDM signal.

4. The method according to claim 1, wherein the performing spatial precoding on the filtered first time domain OFDM signal at each of the M spatial transmission layers, and mapping the filtered first time domain OFDM signal at each of the M spatial transmission layers to each of $N_t$ transmit antenna ports comprises:

mapping, by using a time domain precoding vector $W_i$ on first filtering bandwidth, the filtered first time domain OFDM signal at an $i^{th}$ spatial transmission layer in the M spatial transmission layers to each of the $N_t$ transmit antenna ports, wherein i=1, 2, . . . , M, and i represents an index of the M spatial transmission layers.

5. The method according to claim 2, wherein the performing spatial precoding on the second time domain OFDM signal that is obtained after digital frequency conversion and that is at each of the N spatial transmission layers, and mapping the filtered second time domain OFDM signal at each of the N spatial transmission layers to each of the $N_t$ transmit antenna ports comprises:

mapping, by using a time domain precoding vector $W_j$ on second filtering bandwidth, the filtered second time domain OFDM signal at a $j^{th}$ spatial transmission layer in the N spatial transmission layers to each the $N_t$ transmit antenna ports, wherein j=1, 2, . . . , N, and j represents an index of the N spatial transmission layers.

6. A signal transmission apparatus, comprising:
at least one processor;
a non-transitory computer-readable storage medium coupled to the at least one processor and storing programming instructions for execution by the at least one processor, wherein the programming instructions instruct the at least one processor to:
filter a first time domain OFDM signal at each of M spatial transmission layers at a first sampling rate, wherein M is an integer greater than or equal to 1;
perform upsampling on the filtered first time domain OFDM signal at each of the M spatial transmission layers at a second sampling rate, wherein the second sampling rate is greater than the first sampling rate;
perform, at the second sampling rate, digital frequency conversion on the first time domain OFDM signal that is obtained after upsampling and that is at each of the M spatial transmission layers, so that a center frequency of the first time domain OFDM signal that is obtained after upsampling and that is at each of the M spatial transmission layers is located in a frequency location corresponding to a system broadband to which the first time domain OFDM signal belongs;
perform spatial precoding on the filtered first time domain OFDM signal that is obtained after digital frequency conversion and that is at each of the M spatial transmission layers; and map the filtered first time domain OFDM signal at each of the M spatial transmission layers to each of $N_t$ transmit antenna ports, wherein $N_t$ is an integer greater than or equal to M; and a transceiver, configured to superpose and transmit the first time domain OFDM signals that are at the M spatial transmission layers and that are mapped to all the $N_t$ transmit antenna ports.

7. The apparatus according to claim 6, wherein the programming instructions instruct the at least one processor to:

filter a second time domain OFDM signal at each of N spatial transmission layers at a third sampling rate, wherein N is an integer greater than or equal to 1;

perform upsampling on the filtered second time domain OFDM signal at each of the N spatial transmission layers at a fourth sampling rate, wherein the fourth sampling rate is greater than the third sampling rate;

perform, at the fourth sampling rate, digital frequency conversion on the second time domain OFDM signal that is obtained after upsampling and that is at each of the N spatial transmission layers, so that a center frequency of the second time domain OFDM signal that is obtained after upsampling and that is at each of the N spatial transmission layers is located in a frequency location corresponding to a system broadband to which the second time domain OFDM signal belongs; and configured to: perform spatial precoding on the second time domain OFDM signal that is obtained after digital frequency conversion and that is at each of the N spatial transmission layers, and map the filtered second time domain OFDM signal at each of the N spatial transmission layers to each of the $N_t$ transmit antenna ports; and the transceiver is configured to superpose and transmit the first time domain OFDM signals that are at the M spatial transmission layers and that are mapped to all the $N_t$ transmit antenna ports and the second time domain OFDM signals at the N spatial transmission layers.

8. The apparatus according to claim 7, wherein the programming instructions instruct the at least one processor to filter a third time domain OFDM signal corresponding to each of the $N_t$ transmit antenna ports at a fifth sampling rate, wherein the fifth sampling rate is greater than the first sampling rate, the third sampling rate, or both; and the transceiver is configured to superpose and transmit the first time domain OFDM signals that are at the M spatial transmission layers and that are mapped to all the $N_t$ transmit antenna ports, the second time domain OFDM signals at the N spatial transmission layers, and the filtered third time domain OFDM signal.

9. The apparatus according to claim 6, wherein the programming instructions instruct the at least one processor to:

map, by using a time domain precoding vector $W_i$ on first filtering bandwidth, the filtered first time domain OFDM signal at an $i^{th}$ spatial transmission layer in the M spatial transmission layers to each of the $N_t$ transmit antenna ports, wherein i=1, 2, . . . , M, and i represents an index of the M spatial transmission layers.

10. The apparatus according to claim 7, wherein the programming instructions instruct the at least one processor to:

map, by using a time domain precoding vector $W_j$ on second filtering bandwidth, the filtered second time domain OFDM signal at a $j^{th}$ spatial transmission layer in the N spatial transmission layers to each of the $N_t$ transmit antenna ports, wherein j=1, 2, ..., N, and j represents an index of the N spatial transmission layers.

\* \* \* \* \*